United States Patent
Shuck et al.

(10) Patent No.: US 11,787,105 B2
(45) Date of Patent: Oct. 17, 2023

(54) FUSED FILAMENT FABRICATION OF COMPONENTS INCLUDING PREDETERMINED YIELD POINTS BASED ON COMPOSITION FUNCTIONS

(71) Applicants: Rolls-Royce Corporation, Indianapolis, IN (US); Rolls-Royce North American Technologies, Inc., Indianapolis, IN (US)

(72) Inventors: Quinlan Yee Shuck, Indianapolis, IN (US); Scott Nelson, Carmel, IN (US); Raymond Ruiwen Xu, Carmel, IN (US); Brandon David Ribic, Noblesville, IN (US); Matthew R. Gold, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 52 days.

(21) Appl. No.: 17/097,497

(22) Filed: Nov. 13, 2020

(65) Prior Publication Data

US 2021/0146604 A1    May 20, 2021

Related U.S. Application Data (60) Provisional application No. 62/935,525, filed on Nov. 14, 2019.

(51) Int. Cl.
*B29C 64/118* (2017.01)
*B22F 10/28* (2021.01)
(Continued)

(52) U.S. Cl.
CPC ............ *B29C 64/118* (2017.08); *B22F 10/28* (2021.01); *B29K 2103/06* (2013.01);
(Continued)

(58) Field of Classification Search
None
See application file for complete search history.

(56) References Cited

U.S. PATENT DOCUMENTS

2002/0051848 A1\* 5/2002 Li ........................... C23C 26/02
427/376.6
2002/0104762 A1\* 8/2002 Stonas ................... B82Y 25/00
205/222
(Continued)

FOREIGN PATENT DOCUMENTS

AU  2010275788 A1 \* 2/2012 ............. H01G 11/32
CA  2372911 A1 \* 11/2000
(Continued)

OTHER PUBLICATIONS

CA 2372911 A1 translation (Year: 2022).\*
(Continued)

*Primary Examiner* — Xiao S Zhao
*Assistant Examiner* — Guy F Mongelli
(74) *Attorney, Agent, or Firm* — Shumaker & Sieffert, P.A.

(57) ABSTRACT

An additively manufactured component that includes a tool with a region having a plurality of overlying metal layers each derived from a metal powder filament. The region has a predetermined yield point selected based on an operation to be performed with the tool.

7 Claims, 7 Drawing Sheets

(51) Int. Cl.
*B33Y 10/00* (2015.01)
*B29L 31/28* (2006.01)
*B33Y 70/00* (2020.01)
*B33Y 80/00* (2015.01)
*B29K 103/06* (2006.01)
*B33Y 30/00* (2015.01)

(52) U.S. Cl.
CPC ......... *B29L 2031/283* (2013.01); *B33Y 10/00* (2014.12); *B33Y 30/00* (2014.12); *B33Y 70/00* (2014.12); *B33Y 80/00* (2014.12)

(56) References Cited

U.S. PATENT DOCUMENTS

| | | | | |
|---|---|---|---|---|
| 2003/0100448 | A1* | 5/2003 | Cutler | B01J 35/04 |
| | | | | 419/10 |
| 2003/0236588 | A1* | 12/2003 | Jang | B82Y 30/00 |
| | | | | 977/839 |
| 2005/0200067 | A1* | 9/2005 | Browne | H02N 2/0095 |
| | | | | 269/289 R |
| 2009/0087338 | A1* | 4/2009 | Mitchell | C22C 1/0491 |
| | | | | 148/419 |
| 2013/0085736 | A1* | 4/2013 | Reihsen | G09B 23/28 |
| | | | | 703/11 |
| 2015/0125334 | A1* | 5/2015 | Uetani | B22F 10/18 |
| | | | | 419/36 |
| 2015/0328840 | A1* | 11/2015 | Zachariasen | G06F 30/17 |
| | | | | 700/98 |
| 2016/0151861 | A1* | 6/2016 | Soracco | B22F 5/10 |
| | | | | 219/76.12 |
| 2017/0217393 | A1 | 8/2017 | Mohapatra et al. | |
| 2017/0361600 | A1* | 12/2017 | Bandyopadhyay | B33Y 80/00 |
| 2018/0071819 | A1* | 3/2018 | Connor | B29C 64/106 |
| 2018/0162013 | A1* | 6/2018 | Fulop | C09D 123/12 |
| 2018/0223167 | A1* | 8/2018 | AlBahrani | C09K 8/36 |
| 2018/0243985 | A1* | 8/2018 | Frenock | B29C 64/209 |
| 2018/0361510 | A1* | 12/2018 | Stamp | B23K 26/34 |
| 2019/0030605 | A1 | 1/2019 | Tenhouten et al. | |
| 2019/0118486 | A1 | 4/2019 | Compton et al. | |
| 2019/0308241 | A1* | 10/2019 | Lundin | B33Y 70/00 |
| 2019/0359877 | A1* | 11/2019 | Boul | C09K 8/5045 |
| 2020/0316684 | A1* | 10/2020 | Shuck | B33Y 30/00 |
| 2022/0162124 | A1* | 5/2022 | Boon | C04B 24/2647 |

FOREIGN PATENT DOCUMENTS

| | | | | |
|---|---|---|---|---|
| CA | 2851535 | A1 * | 4/2013 | ............. B82Y 30/00 |
| CN | 1648284 | A * | 8/2005 | |
| CN | 101626885 | A * | 1/2010 | ............... A23B 4/06 |
| CN | 105001661 | A * | 10/2015 | |
| CN | 105618755 | * | 6/2016 | |
| DE | 112014007131 | * | 7/2017 | ......... H01L 27/3244 |
| JP | 2004047409 | A * | 2/2004 | ......... H01L 27/3244 |
| WO | WO-9509257 | A1 * | 4/1995 | ............... D01F 11/04 |
| WO | WO-2015200201 | A1 * | 12/2015 | ......... B29C 35/0805 |
| WO | WO-2017077137 | A2 * | 5/2017 | ................ B22F 1/00 |
| WO | WO-2017/112521 | A1 * | 6/2017 | ............... A23B 4/06 |
| WO | WO-2017112483 | A2 * | 6/2017 | ........... B29C 64/129 |
| WO | WO-2017112521 | A1 * | 6/2017 | |
| WO | WO-2017112571 | A1 * | 6/2017 | ........... B29C 64/135 |
| WO | WO-2017112653 | A1 * | 6/2017 | ........... B29C 64/124 |
| WO | WO-2017112682 | A1 * | 6/2017 | ........... B29C 64/129 |

OTHER PUBLICATIONS

CN 105618755 translation (Year: 2022).*
CN-1648284-A translation (Year: 2023).*
U.S. Appl. No. 17/097,746, filed Nov. 13, 2020, by Shuck et al.
Miaidin et al., "Finite Element Analysis of Low Velocity Behaviour on Fused Deposition Modeling Printed Stab-Resistant Body Armour Design Features," Journal of Advanced Manufacturing Technology, Jan. 2018, pp. 475-489.
Peck, "The Army Can Now 3D-Print Body Armor on the Fly," taskandpurpose.com, Jul. 16, 2019, 4 pp.

* cited by examiner

FUSED FILAMENT FABRICATION OF COMPONENTS INCLUDING PREDETERMINED YIELD POINTS BASED ON COMPOSITION FUNCTIONS

This application claims the benefit of U.S. Provisional Application No. 62/935,525, titled, "FUSED FILAMENT FABRICATION OF COMPONENTS INCLUDING STRUCTURES FOR ABSORPTION OF KINETIC ENERGY", filed Nov. 14, 2019, which is incorporated herein by reference in its entirety.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

In general, the present disclosure describes example techniques, systems, materials, and compositions for additively manufacturing a wide range of components including energy absorbing structures. Using fused filament fabrication (FFF), metallic components can be designed and manufactured to absorb kinetic energy through integrally built strategically weakened regions, internally reinforced regions, sacrificial regions, and combinations thereof. These sacrificial, energy absorbing, or reinforced regions may be integrally incorporated into the metal component at specific locations as the component is formed, which allows the metal component or portions thereof to strategically fail or deflect. For example, in some embodiments the metal component is an enclosure that fails or deflects to protect the structural integrity of a vital component within the enclosure, or to prevent unwanted egress of all or a portion of the vital component from the enclosure.

FFF allows these complex energy absorbing features to be built into the metallic component in situ, allowing for very cost effective implementation compared to conventional manufacturing techniques. In addition, FFF allows complex features such as, for example, solid regions, hollow regions and reinforced ribbed regions, to be combined together in a metallic component in a myriad of complex arrangements that are either not possible, or prohibitively expensive, with conventional metal casting techniques.

In one aspect, the present disclosure is directed to an additively manufactured component that includes a tool with a region having a plurality of overlying metal layers each derived from a metal powder filament. The region has a predetermined yield point selected based on an operation to be performed with the tool.

In another aspect, the present disclosure is directed to an additively manufactured tool including a plurality of overlying metal layers, each derived from a metal powder filament. A region of the tool has a predetermined yield point selected based on an operation to be performed with the tool.

In another aspect, the present disclosure is directed to an additively manufactured cover for a component. The cover includes a plurality of overlying metal layers, each derived from a metal powder filament. The cover includes a lifting lug integrally formed with the cover.

In another aspect, the present disclosure is directed to an enclosure including a plurality of overlying metal layers, each derived from a metal powder filament. The enclosure includes an open chamber configured to house a critical component and a wall at least partially surrounding the chamber, wherein the infill of the wall is varied to prevent damage to the critical component.

In another aspect, the present disclosure is directed to an enclosure including a plurality of overlying metal layers, each derived from a metal powder filament. The enclosure includes an open chamber configured to house a critical component and an arrangement of walls at least partially surrounding the chamber, wherein the arrangement of walls comprises a first wall adjacent to the chamber, an outside wall, and an intermediate wall between the first wall and the outside wall, and wherein the infill of the walls is varied to prevent damage to the critical component.

In another aspect, the present disclosure is directed to a protective plate including a plurality of overlying metal layers, each derived from a metal powder filament. The plate includes an arrangement of walls, wherein the infill of the walls is configured to prevent damage to a surface underlying the protective plate.

In another aspect, the present disclosure is directed to a protective enclosure including a plurality of overlying metal layers, each derived from a metal powder filament. The enclosure includes an open chamber configured to house a critical component and an arrangement of walls at least partially surrounding the chamber, wherein the arrangement of walls includes a first wall adjacent to the chamber, an outside wall, and an intermediate wall between the first wall and the outside wall, and wherein the infill of the walls is varied to prevent egress of the critical component from the protective enclosure.

In another aspect, the present disclosure is directed to a method including forming a component on the major surface of a substrate. The component includes a region with a plurality of overlying metal layers, each derived from a filament including a powder with a polymeric binder and a metal. The region has a predetermined yield point selected based on a selected function of the component.

In another aspect, the present disclosure is directed to an additive manufacturing system, including: a substrate defining a major surface; a filament delivery device with a filament including a powder with a polymeric binder and a metal; and a computing device configured to form a component on the major surface of the substrate. The component includes a region with a plurality of overlying metal layers each derived from the filament, and wherein the region has a predetermined yield point selected based on a selected function of the component.

The details of one or more examples are set forth in the accompanying drawings and the description below. Other features, objects, and advantages will be apparent from the description and drawings, and from the claims.

DETAILED DESCRIPTION

The present disclosure generally describes techniques for forming additively manufactured components using fused filament fabrication (FFF). Additive manufacturing of metal or alloy components may present unique challenges, for example, compared to additive manufacturing of polymeric components. For example, while techniques such as powder bed fusion (including direct metal laser sintering, electron beam melting, selective laser sintering, or the like), which use a directed energy beam to fuse and sinter material, may be useful in additive manufacturing, some alloys may respond to energy beams in a manner that may not be conducive to localized melting or localized sintering. Further, powder bed fusion may leave residual unfused or unsintered powder residue, for example, within channels or hollow internal passages of an additively manufactured component. Powder bed fusion of high temperature alloys may also result in components that may be prone to cracking due to localized melting and thermal gradients.

In some examples, a material including a sacrificial binder and a powder including at least one powdered metal dispersed in the binder may be deposited using fused filament fabrication to form an additively manufactured component. After additively forming one or more layers of the component, or after forming the entire component, the binder may be selectively removed or sacrificed from the layers or the component, for example, using heating, chemical dissolution, or the like. Sacrificing the binder from the layers or the component may leave substantially only the powder in the layers or the component. The component may be further treated, for example, by sintering, to strengthen or densify the powder and form the additively manufactured component. By using the material including the sacrificial binder and the powder, removing the sacrificial binder, and sintering the powder, high-melt temperature alloys may be used, residual (free) powder may be reduced, and crack propensity may be reduced due to the absence of melting. Further, microstructure of the additively manufactured component may be more carefully controlled by controlling microstructure of the powder and avoiding melting of the powder during processing.

Figure 1:
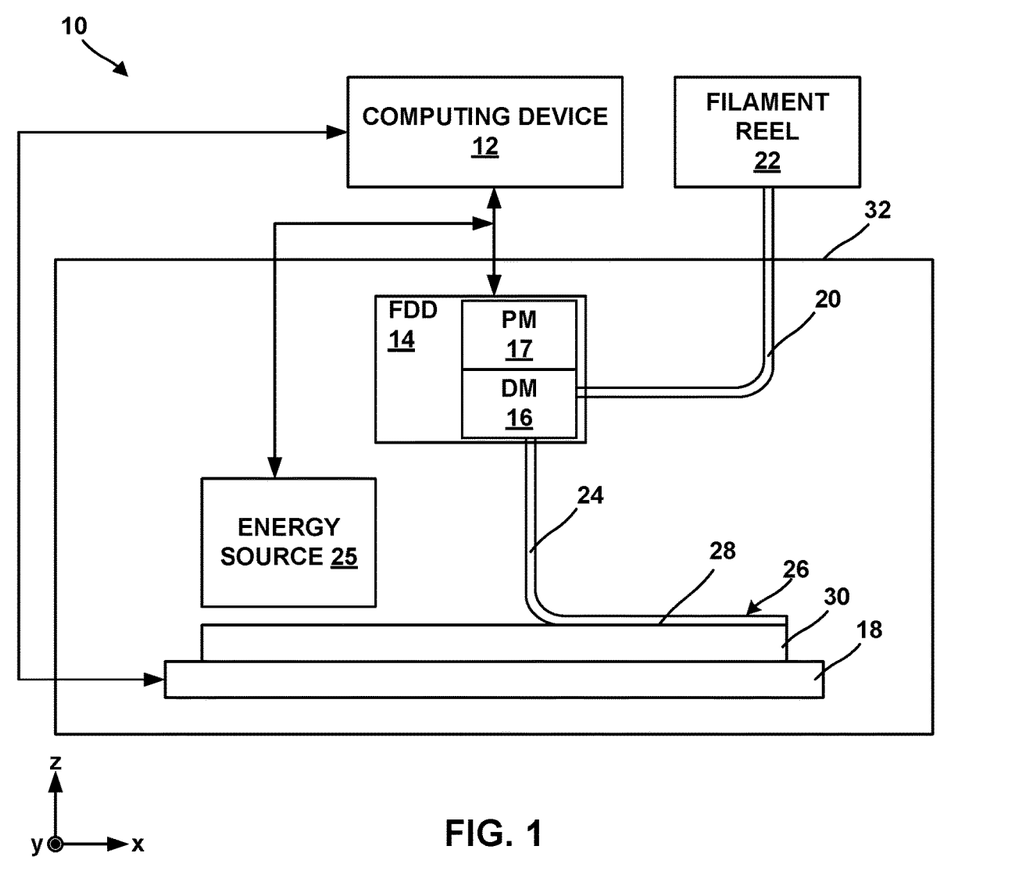
FIG. 1 is a conceptual block diagram illustrating an example system for forming an additively manufactured component by fused filament fabrication (FFF) of a material including a metal or alloy powder and a binder.

The present disclosure describes example techniques, systems, materials, and compositions for additively manufacturing a wide range of components including energy absorbing structures. Using FFF processes, metallic components can be designed and manufactured to absorb kinetic energy through integrally built strategically weakened regions, internally reinforced regions, sacrificial regions, and combinations thereof. These sacrificial, energy absorbing, or reinforced regions may be integrally incorporated into the metal component at specific locations as the component is formed, which allows the metal component or portions thereof to strategically fail or deflect. FIG. 1 is a conceptual block diagram illustrating an example fused filament fabrication system 10 for performing fused filament fabrication to form an additively manufactured component including a powder and a binder by filament delivery. Additive manufacturing system 10 may include computing device 12, filament delivery device 14, enclosure 32, and stage 18.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 14 may include, for example, a delivery mechanism (DM) 16 for delivering a filament 20 to or near stage 18, and an optional positioning mechanism (PM) 18. Filament delivery device 14 may advance filament 20 from a filament reel 22 and heat filament 20 to above a softening or melting point of a component of filament 20 (e.g., a polymeric binder) to form a softened filament 24. Softened filament 24 is then extruded from delivery mechanism 16 and laid down in a road 26 on a major surface 28 of a substrate 30 (or, in subsequent layers, on a previously deposited road). The softened filament 34 cools and, in this way, is joined to other roads.

Substrate 30 may include a build plate on stage 18, or any suitable substrate defining a build surface. For example, substrate 30 may include a metal or glass plate defining a substantially planar surface. In other examples, substrate 30 may include surface features or a shaped (e.g., curved or curvilinear) surface on which the additively manufactured component is manufactured. In some examples, system 10 may not include a separate substrate 30, and filament delivery device 14 may deposit softened filament 24 on a build surface defined by stage 18, or on another component, or on layers of prior softened filament 24 or another material.

In some examples, filament delivery device 14 may, instead of receiving filament 20 from filament reel 22, include a chamber that holds a volume of a composition. The composition may be flowable, extrudable, or drawable from filament delivery device 14, for example, from delivery mechanism 16, in the form of softened filament 24 that may be deposited on or adjacent stage 18 or substrate 30. Softened filament 24 of the composition may be dried, cured, or otherwise solidified to ultimately form an additively manufactured component. In some examples, system 10 may include an energy source 25 configured to deliver energy to softened filament 24 to cure softened filament 24, for example, by photocuring or thermally curing the composition of softened filament 24.

Computing device 12 may be configured to control relative movement of filament delivery device 14 and/or stage 18 to control where filament delivery device 14 delivers softened filament 24. For example, stage 18 may be movable relative to filament delivery device 14, filament delivery device 14 may be movable relative to stage 18, or both. In some implementations, stage 18 may be translatable and/or rotatable along at least one axis to position substrate 30 relative to filament delivery device 14. For instance, stage 18 may be translatable along the z-axis shown in FIG. 1 relative to filament delivery device 14. Stage 18 may be configured to selectively position and restrain substrate 30 in place relative to stage 18 during manufacturing of the additively manufactured component.

Similarly, filament delivery device 14 may be translatable and/or rotatable along at least one axis to position filament delivery device 14 relative to stage 18. For example, filament delivery device 14 may be translatable in the x-y plane shown in FIG. 1, and/or may be rotatable in one or more rotational directions. Filament delivery device 14 may be translated using any suitable type of positioning mechanism 17, including, for example, linear motors, stepper motors, or the like.

Computing device 12 may be configured control movement and positioning of filament delivery device 14 relative to stage 18, and vice versa, to control the locations at which roads 26 are formed. Computing device 12 may be configured to control movement of filament delivery device 14, stage 18, or both, based on a computer aided manufacturing or computer aided design (CAM/CAD) file. For example, computing device 12 may be configured to control filament delivery device 14 (e.g., positioning mechanism 17) to trace a pattern or shape to form a layer including a plurality of roads on surface 38. Computing device 12 may be configured to control filament delivery device 14 or stage 18 to move substrate 30 away from filament delivery device 14, then control filament delivery device 14 to trace a second pattern or shape to form a second layer including a plurality of roads 26 on the first layer. Computing device 12 may be configured to control stage 18 and filament delivery device 14 in this manner to result in a plurality of layers, each layer including a traced shape or design. Together, the plurality of layers defines an additively manufactured component.

System 10 also includes an enclosure 32 that at least partially encloses filament delivery device 14 and stage 18, and optionally, energy source 25. In some examples, enclosure 32 substantially fully encloses delivery device 14 and stage 18, such that the environment within enclosure 32 may be controlled. In some examples, enclosure 32 includes or is coupled to a heat source configured to heat the interior environment of enclosure 32, a gas source and/or pump configured to control an atmospheric composition of the interior environment of enclosure 32, or the like. In this way, enclosure 32 may protect filament 20 and softened filament 24 during formation of the additively manufactured component, e.g., from unwanted chemical reactions that may change properties of the metal or alloy powder.

Filament reel 22 holds a filament 20 having a selected composition. In some examples, system 10 includes a single filament reel 22 holding a single filament 20 having a single composition. In other examples, system 10 may include multiple filament reels 22, each filament reel holding a filament 20 having a selected composition. Regardless of the number of filaments 20 and filament reels 22, each filament may include a metal or alloy powder and a binder configured to bind the metal or alloy powder in filament 20.

The metal or alloy powder may include any suitable metal or alloy for forming an additively manufactured component. In some examples, the metal or alloy powder include a high-performance metal or alloy for forming component used in mechanical systems, such as a steel (e.g., stainless steel), a nickel-based alloy, a cobalt-based alloy, a titanium-based alloy, or the like. In some examples, the metal or alloy powder may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the metal or alloy powder may include a polycrystalline nickel-based superalloy or a polycrystalline cobalt-based superalloy, such as an alloy including NiCrAlY or CoNiCrAlY. For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, Wis. In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, Mich. In some examples, a metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wis.

In some examples, in addition to a metal or alloy powder, the powder may include a ceramic, such as an oxide. For example, the powder may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Powders including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

Filament 20 also includes a sacrificial binder. The sacrificial binder may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The metal or alloy powder may be dispersed in the sacrificial binder, for example substantially uniformly dispersed in the sacrificial binder.

In some examples, the sacrificial binder may be in the form of a curable polymer precursor. The curable polymer precursor may be curable (for example, thermally curable or photocurable) to form the sacrificial binder. For example, the curable polymer precursor may be cured as softened filaments 24 are extruded and/or after softened filaments 24 are laid down in roads 26 to form a material including the metal or alloy powder dispersed in the sacrificial binder, for example substantially uniformly dispersed in the sacrificial binder. The curable polymer precursor may include a precursor, for example, one or more monomers, oligomers, or non-crosslinked polymers suitable for forming the polymeric material of the sacrificial binder upon curing. Thus, in some examples, energy source 25 may direct energy at a curable polymer precursor, for example, in the material, to selectively cure the curable polymer precursor to form roads 26 including the material that includes the metal or alloy powder and the sacrificial binder. In other examples, the heat to which the composition is exposed to form softened filaments 24 may initiate the curing reaction, and no additional energy source is used.

Filament 20 includes a selected amount of sacrificial binder and metal or alloy powder so that the material in roads 26 may include more than about 80% by volume of the metal or alloy powder, which may result in a substantially rigid component with reduced porosity being formed in response to removal of the sacrificial binder. In some examples, filament 20 includes sacrificial binder in an amount configured to cause the material to shrink by less than about 20 volume percent relative to an initial volume of the material in response to removing the sacrificial binder. For example, filament 20 may include less than about 20% by volume of the sacrificial binder.

In some examples, filament 20 includes at least one shrink-resistant agent. For example, the at least one shrink-resistant agent may include a ceramic, instead of, or in addition to, the oxide in any ODS present in the material(s).

Figure 2:
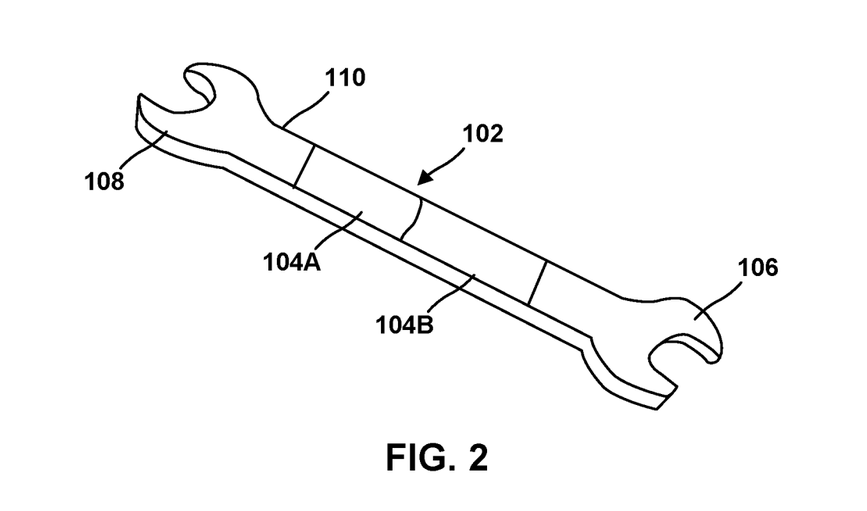
FIG. 2 is a schematic perspective view of an example embodiment of a tool made using a FFF process.

Referring now to FIG. 2, in one embodiment the FFF system 10 of FIG. 1 may be used to form a portion of a hand tool 100 such as, for example, an open or closed end wrench, a torque wrench, a socket wrench, a screwdriver, pliers, a pry bar, pliers, and the like.

In one example, the tool 100 includes at least one region 102 on a handle 110 thereof formed by a plurality of overlying metal layers each derived from the metal powder filament of the FFF system. In one embodiment, the tool 100 includes metal box regions 106, 108 at opposed ends of the handle 110. The region 102 formed using FFF has a predetermined yield point selected based on an operation to be performed with the tool. In the present application the term yield point refers to a level of stress that, when applied to a region of an FFF-derived article in any direction, causes resistance of the molecules in the region to break down rapidly, resulting in a sudden and large increase of deformation of the region (fracturing, cracking, delaminating, and the like, or complete failure).

For example, if the tool 100 is used to perform a particular task, and the force applied to the region 102 results in excess stress to any portion of the tool 100, the region 102 can be configured such that the region 102 fails. The failure of the region 102 by, for example, cracking, splitting, or fracturing, can protect a user of the tool, or prevent damage to a bolt or other fastener acted on by the tool.

In another example, the region 102 formed using FFF include a first portion 104A with a first yield point and a second portion 104B with a second yield point different from the first yield point, and wherein the second portion 104B fails at a predetermined stress level encountered in an operation to be performed with the tool. In some examples, which are not intended to be limiting, the first region 104A and the second region 104B can be configured to fail under different levels of applied stress by being formed with different thicknesses, different metal densities, different cross-sectional shapes, and the like.

In another example, the region of the tool 100 designed for intentional failure at a predetermined stress level can be the box ends 106, 108, or a portion thereof.

In another example, the entire tool 100 can be made using FFF, and the region designed for intentional failure can be along the handle 110, or at the box ends 106, 108, or an combination thereof.

Figure 3:
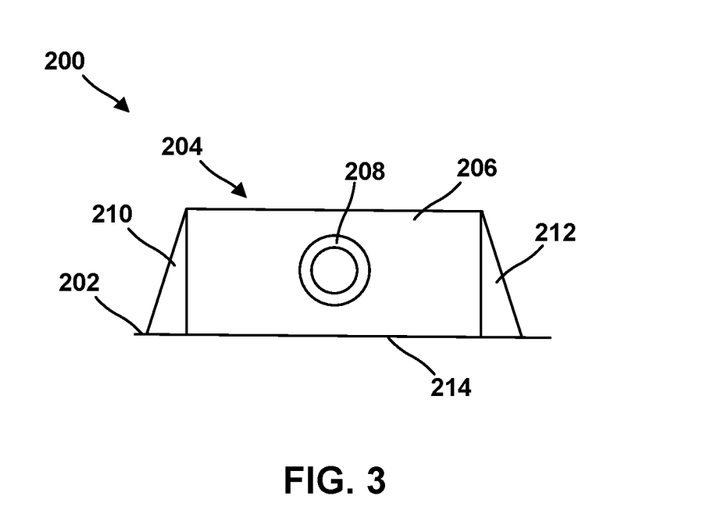
FIG. 3 is a schematic side view of an example embodiment of a cover made using a FFF process and including an integrally formed lifting lug.

Referring now to FIG. 3, in another example an additively manufactured cover 200 for a component includes a plurality of overlying metal layers each derived from a metal powder filament in the FFF system of FIG. 1. In the portion shown in FIG. 3, the cover 200 includes an outer shell or cowling 202 with an integrally formed lifting lug 204. The lug 204 includes a plate 206 and a lifting eye 208 configured to engage a lifting chain, an eyelet, or a hook such that the cover can be lifted off the ground or moved from one position to another. In various examples, all or a selected portion of the lifting lug 204 includes a predetermined yield point selected based on a lifting operation performed with the lug, and all or a portion of the lifting lug 204 is configured to fail when an excessive lifting force is applied to the eye 208. In some examples, which are not intended to be limiting, the plate 206, the lifting eye 208, or an interface 214 between the lifting lug 204 and the cover 202 can be configured to fail under different levels of applied stress by being formed with different thicknesses, different metal densities, different cross-sectional shapes, and the like.

In some embodiments, the lifting lug 204 includes optional reinforcing ribs, tabs or fillets 210, 212, which can modify the predetermined failure characteristics of the cover 200.

In one example, which is not intended to be limiting, the cover 200 is a cover for a turbine engine, or a cowling for a turbine engine.

Figure 4A:
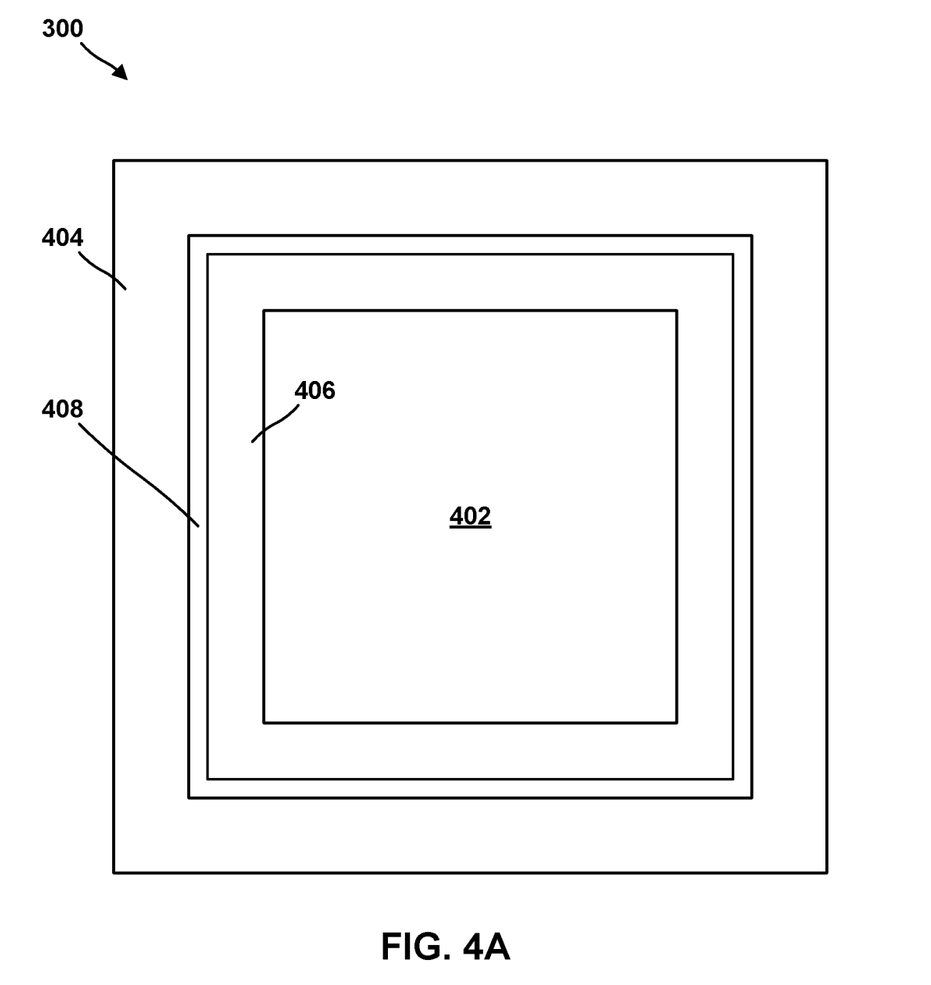
FIGS. 4A-4B are schematic overhead views of example embodiments of enclosures made using a FFF process.

In another embodiment shown schematically in FIG. 4A, an enclosure 300 includes a structure formed from a plurality of overlying metal layers, each derived from a metal powder filament of the FFF system of FIG. 1. The enclosure includes an open chamber 402 configured to house a critical component (not shown in FIG. 4A) and at least one wall 404 at least partially surrounding the chamber 402. In this application the term critical component includes an article that the enclosure is configured to protect. For example, the critical component may be fragile, may have fragile components therein, may have sharp protrusions that can potentially cause damage to surroundings, may be sensitive to water or certain chemicals, may emit or be damaged by ionizing radiation, and the like. In one embodiment, the infill of the wall 404 is varied to prevent damage to the chamber 402 and the critical component housed therein. For example, the wall 404 can have portions with different thicknesses, different metal densities, different cross-sectional shapes, and the like.

In another example, the enclosure 400 includes the exterior wall 404, an interior wall 406 adjacent to the chamber 402, and an intermediate wall 408 between the exterior wall 404 and the interior wall 406. In some embodiments, the interior wall 406 is a solid wall with a first metal density, while intermediate wall 408 and exterior wall 404 are also solid walls with different metal densities. In various embodiments, the metal density of the first wall 404 can be greater or less than the metal densities of the other walls 406, 408. For example, the outer wall 404 can have a low metal density and be configured to be collapsible when impacted by a foreign object at a certain force level, and can absorb energy to prevent breach of the chamber 402. In another example, the outer wall 404 can have a metal density greater than the metal density of the walls 406, 408, and can provide a rigid barrier to prevent breach of the enclosure 400.

Figure 4B:
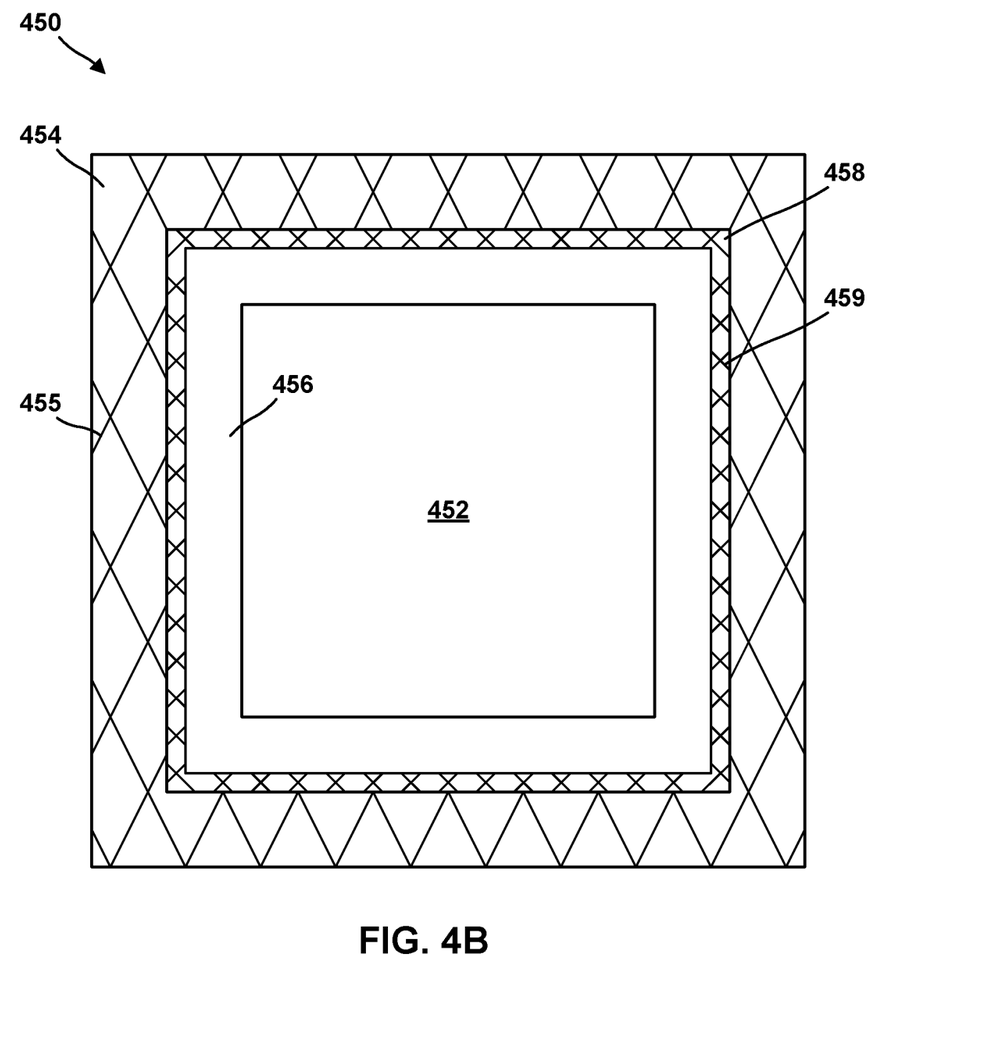

In another embodiment shown in FIG. 4B, an enclosure 450 includes a structure formed from a plurality of overlying metal layers, each derived from a metal powder filament of the FFF system of FIG. 1. The enclosure includes an open chamber 452 configured to house a critical component (not shown in FIG. 4B). The chamber 452 is at least partially enclosed by an exterior wall 404, an interior wall 456 adjacent to the chamber 452, and an intermediate wall 458 between the exterior wall 454 and the interior wall 456. In the embodiment of FIG. 4B, the interior wall 456 is a solid wall, while intermediate wall 408 and exterior wall 404 include a respective arrangement of reinforcing ribs 459 and 455 arranged in a cross-hatched pattern. While cross-hatched ribs are shown by way of example, the reinforcing ribs 455, 459 may have any suitable shape or arrangement. One particular advantage of reinforcing ribs made using FFF is that welds, solders, adhesives or the like are not necessary to attach them to each other or to the walls of the enclosure, and as a result the ribs create a particularly strong and penetration resistant structure.

As shown in FIG. 4B, the ribs 455 in the outer wall 454 have a lower density than the ribs 459 in the intermediate wall 458. For example, the lower density ribs 455 can be configured such that the outer wall 454 is collapsible when impacted by a foreign object at a certain force level, and can absorb kinetic energy to prevent breach of the chamber 402. If the foreign object breaches the outer wall 454, the foreign object encounters the intermediate wall 458, which includes an even higher density of cross-hatched ribs, and as such the intermediate wall 458 can absorb even more kinetic energy. If the foreign object breaches the intermediate wall 458, the foreign object encounters the solid inner wall 456, which can be configured to crack or delaminate to absorb even more kinetic energy from the foreign object and further protect the integrity of the chamber 452.

In an alternative embodiment (not shown in FIG. 4B), any of all of the inner wall 456, the intermediate wall 458 and the outer wall 454 can be solid walls and have a gradient of metal density, which can increase along a direction from the chamber 452 to the outside of the enclosure 450, or can increase along a directed from the outside of the disclosure 450 toward the chamber 452. In another embodiment, the density of the ribs 455, 459 in any or all of the walls 454, 456, 458 can increase along a direction from the outside of the enclosure 450 to the inside of the chamber 452, or can increase along a direction from the inside of the chamber 452 to the outside of the enclosure 450. In another embodiment, individual ribs or portions of ribs can have a varying metal density as necessary to protect the chamber 452 or an object retained therein.

In some embodiments, the structure of the walls 454, 456, 458 of the enclosure 450 can be configured to prevent egress of critical component housed in the chamber 452. For example, if the critical component has sharp projections, or is sensitive to moisture, the metal density of the walls 454, 456, 458, the rib density of the walls 454, 456, 458, or both can be designed to absorb kinetic energy and prevent egress of the critical component in the chamber 452. In some embodiments, any or all of the walls 454, 456, 458 can be sacrificial in response to, for example, dropping of the enclosure 450, exposure of the enclosure 450 to a particular chemical or environment, and the like.

In one example embodiment, which is not intended to be limiting, a critical component in the chamber 452 can be a black box for an aircraft, and the walls 454, 456, 458 can be configured to protect the block box in the event the enclosure 450 is exposed to severe forces during a plane crash. In another example embodiment, the walls 454, 456, 458 can be configured to be sacrificial and protect the black box from damage from exposure to high heat, water, firefighting foams, and the like.

Figure 5:
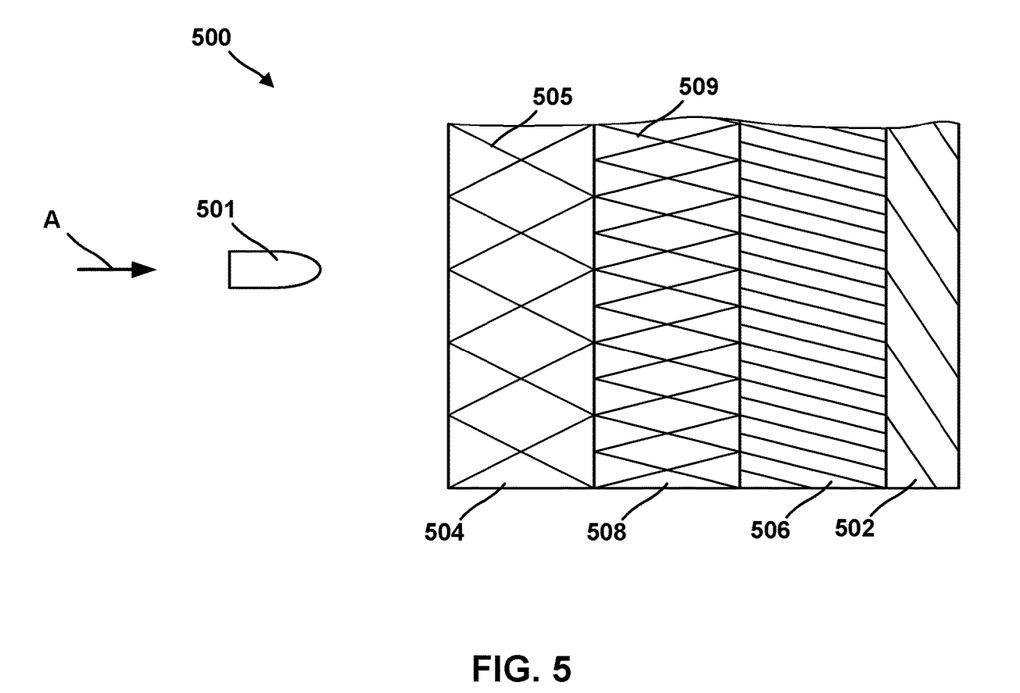
FIG. 5 is a schematic cross-sectional view of an example embodiment of an armor plate made using a FFF process.

In another embodiment shown schematically in FIG. 5, an armor plate 500 includes a structure formed from a plurality of overlying metal layers, each derived from a metal powder filament of the FFF system of FIG. 1. The armor plate 500 is configured to protect a surface 502 such as, for example, a portion of a human body, or an interior of a vehicle, from damage caused by a projectile 501 moving along a direction shown by the arrow A. The armor plate 500 includes an exterior wall 504, an interior wall 506 adjacent to the surface 502, and an intermediate wall 588 between the exterior wall 504 and the interior wall 506. In the embodiment of FIG. 5, the interior wall 506 is a solid wall, while the intermediate wall 508 and the exterior wall 504 include a respective arrangement of reinforcing ribs 509 and 505, respectively, arranged in a cross-hatched pattern. As shown in FIG. 5, the fill in the outer wall 504, in this example ribs 505, has a lower density than the fill (ribs 509) in the intermediate wall 508. For example, the lower density ribs 505 can be configured such that the outer wall 504 is collapsible when impacted by the projectile 501 at a certain force level, and can absorb kinetic energy from the projectile 501 to prevent damage to the surface 502. If the projectile 501 breaches the outer wall 544, the projectile 501 encounters the intermediate wall 508, which includes an even higher density of cross-hatched ribs, and as such the intermediate wall 508 can absorb even more kinetic energy. If the projectile 501 breaches the intermediate wall 508, the projectile 501 encounters the solid inner wall 506, which can be configured to crack or delaminate to absorb even more kinetic energy from the projectile 501 and further protect the integrity of the surface 502.

As discussed above with respect to FIG. 4B, any of all of the inner walls 504, 506, 508 can be solid walls and have a gradient of metal density, which can increase along a direction from the surface 502 to the outside of the armor plate 500, or can increase along a direction from the outside of the disclosure 500 toward the surface 502. In another embodiment, the density of the ribs 505, 509 in any or all of the walls 504, 506, 508 increase along a direction from the outside of the armor plate 500 to the surface 502, or can increase along a direction from the surface 502 to the outside of the armor 500. In another embodiment, individual ribs 505, 509 or portions thereof can have a varying metal density as necessary to protect the surface 502 or an object retained therein.

Figure 6:
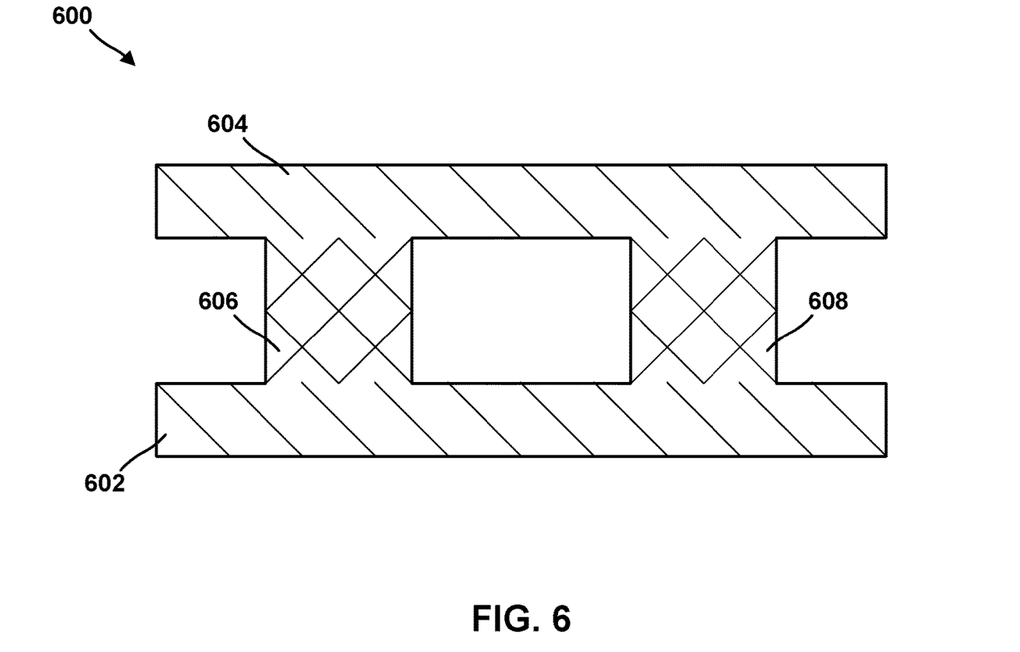
FIG. 6 is a schematic cross-sectional view of an example embodiment of a structure made using a FFF process that includes integrally formed pillars.

In another embodiment shown schematically in FIG. 6, a structure 600 is formed from a plurality of overlying metal layers, each derived from a metal powder filament of the FFF system of FIG. 1. The structure includes a first section 602 and a second section 604 separated by integrally formed supporting pillars 606, 608. When a predetermined force is applied to the first section 602, the second section 604, or both, the pillars 606, 608 are configured to at least partially collapse and allow the sections 602, 604 to move closer to one another. In another embodiment, the pillars 606, 608 are configured to be sacrificial when exposed to a particular chemical composition so that the sections 602, 604 can rest on each other. In various embodiment, the pillars 606, 608 can be utilized in manufacturing of an article, or in a final article to provide a predetermined level of structural integrity to the structure 600.

As discussed above, any of all of the pillars 606, 608 can be solid walls and have a gradient of metal density, which can increase or decrease along a selected direction with respect to the sections 602, 604. In another embodiment, individual pillars 606, 608 can be configured to have a varying metal density as necessary for a particular application, or can include an arrangement of ribs to provide a predetermined level of structural integrity to the structure 600.

Figure 7:
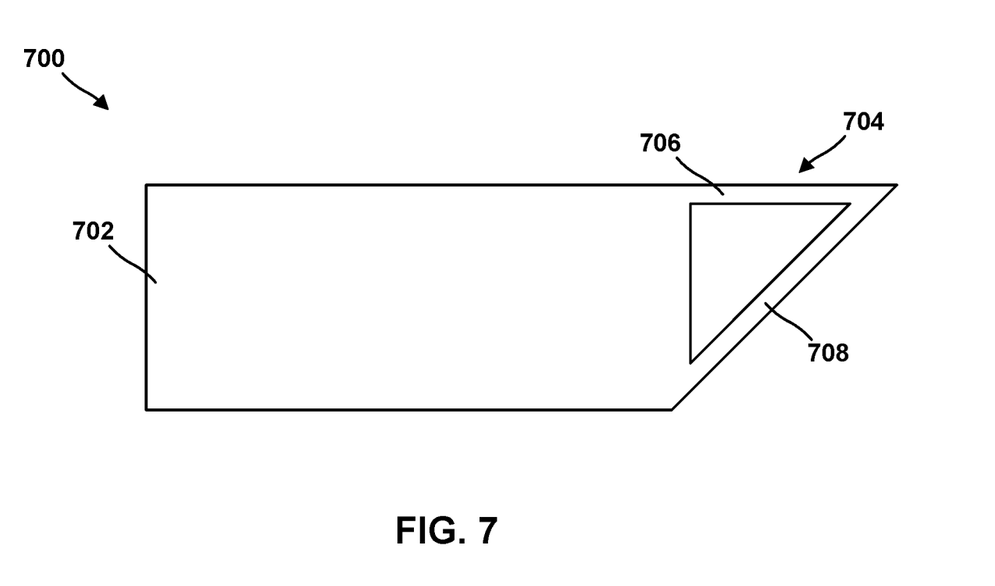
FIG. 7 is a schematic side view of a structure made using a FFF process and include an integrally formed extension.

In another embodiment shown schematically in FIG. 7, a structure 700 is formed from a plurality of overlying metal layers, each derived from a metal powder filament of the FFF system of FIG. 1. The structure 700 includes a wall portion 702 integrally formed with an extension 704. The extension 704 includes an arm 706 and a supporting brace 708. The brace 708 may be configured to fail when a predetermined amount of force is applied to the arm 706, or to be sacrificial when exposed to a particular chemical composition, so that arm 706 fails at a predetermined time or point in a manufacturing process or in use of the structure 700. As discussed above, either or both of the arm 706 and the brace 708 can be a solid section, be hollow, or have a gradient of metal density walls and have a gradient of metal density, which can increase or decrease along a selected direction. In another embodiment, the arm 706 and the brace 708 can be configured to have a varying metal density as necessary for a particular application, or can include an arrangement of ribs to provide a predetermined level of structural integrity to the structure 700.

Figure 8:
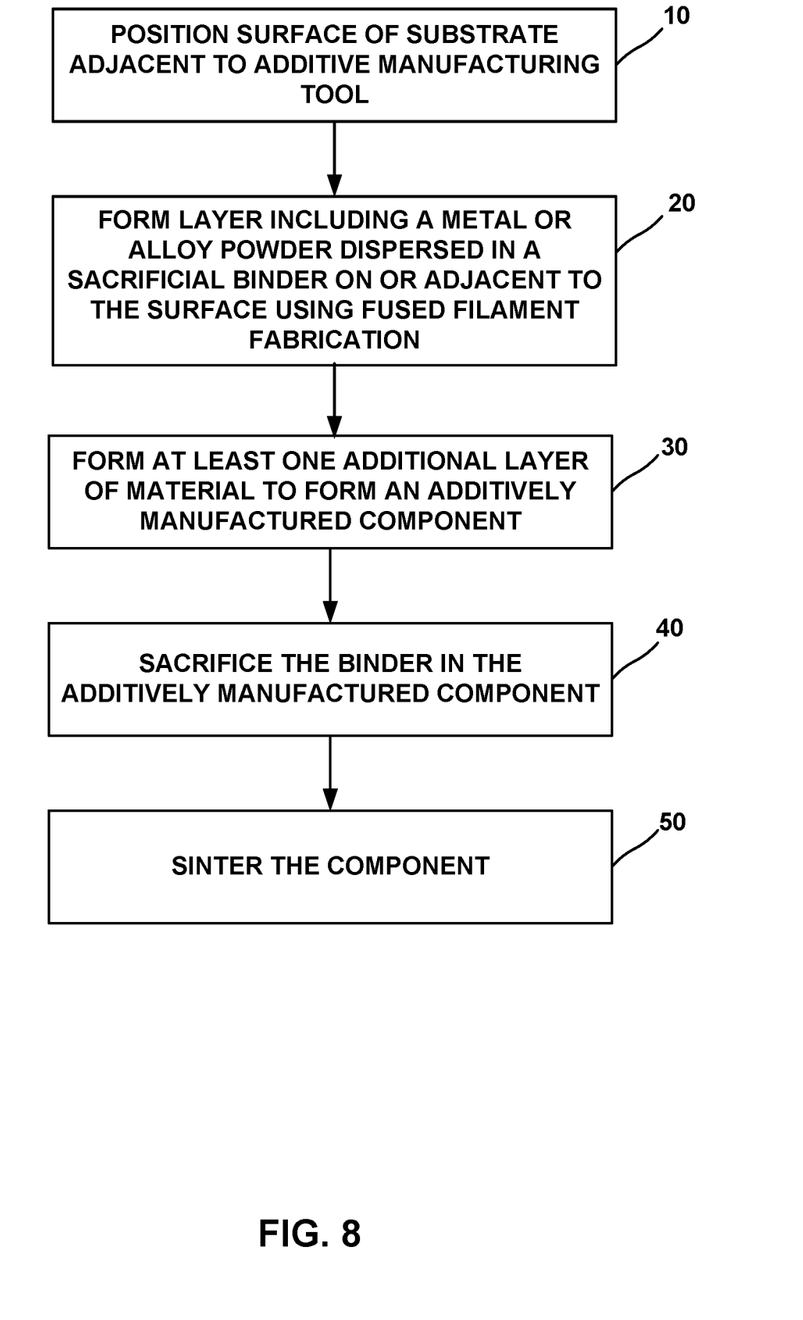
FIG. 8 is a flow diagram illustrating an example technique for forming an additively manufactured component using fused filament fabrication.

An example technique that may be implemented by system 10 will be described with concurrent reference to FIG. 8. FIG. 8 is a flow diagram illustrating an example technique for forming an additively manufactured component including at least one feature smaller than a base resolution of the additive manufacturing technique. Although the technique of FIG. 8 is described with respect to system 10 of FIG. 1, in other examples, the technique of FIG. 8 may be performed by other systems, such a system 30 including fewer or more components than those illustrated in FIG. 1. Similarly, system 10 may be used to performed other additive manufacturing techniques.

The technique of FIG. 8 includes positioning substrate 30 including surface 28 adjacent to a build position, e.g., on stage 18 (10). In some examples, system 10 may not include a separate substrate 30, the technique of FIG. 8 may include positioning a build surface defined by stage 18, or by another component, or layers of prior softened filament 24 or another material.

The technique of FIG. 8 also includes forming a road 26 of material using fused filament fabrication (20). Computing device 12 may cause filament delivery device 14 to deposit softened filament 24 in one or more roads 26 to ultimately form the additively manufactured component. A plurality of roads 26 defining a common plane may define a layer of material. Thus, successive roads 26 may define a series of layers, for example, parallel layers, and the series of layers may eventually define the additively manufactured component.

The technique of FIG. 8 also includes forming, on roads 26 of material, at least one additional layer of material to form an additively manufactured component (30). For example, computing device 12 may control movement and positioning of filament delivery device 14 relative to stage 18, and vice versa, to control the locations at which roads are formed. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of roads 26 on surface 28. Computing device 12 may control filament delivery device 14 or stage 18 to move substrate 30 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines an additively manufactured component (30).

The technique of FIG. 8 includes, after forming the additively manufacturing component (30), sacrificing the binder from the component (40). The sacrificing (40) may include delivering thermal or any suitable energy, for example, by energy source 25, to roads 24 in an amount sufficient to cause binder to be substantially oxidized, incinerated, carbonized, charred, decomposed, or removed from roads 24, while leaving the metal or alloy powder substantially intact. In other examples, the additively manufactured component may be placed in a furnace to heat the additively manufactured component and cause removal of the binder from the component (40).

The technique of FIG. 8 also includes, after sacrificing the binder (40), sintering the component (50). The sintering may include a thermal treatment, for example, one or more predetermined cycles of exposure to predetermined temperatures for predetermined times. In some examples, energy source 25 may deliver energy to cause sintering. In other examples, the additively manufactured component may be placed in a furnace to heat the additively manufactured component and cause sintering. In some examples, the sintering (50) may promote the bonding of particles of powder to each other to strengthen the component including substantially only the powder after the binder is sacrificed. Sintering may not melt the particles of powder, thus leaving the microstructure of the particles substantially intact. This may facilitate forming components with selected microstructures compared to techniques that include melting the powder. The sintering (50) may also densify an interior or a surface region of the component, for example, by promoting powder compaction and reducing porosity. In some examples, the steps of removing the sacrificial binder (40) and sintering the component (50) may be combined in a single heating step or series of heating steps, e.g., within a furnace.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method for additively manufacturing a component, the method comprising:
   forming the component on the major surface of a substrate, wherein the component comprises a region comprising a plurality of overlying metal layers, wherein the metal layers are each derived from a filament comprising a powder comprising a polymeric binder and a metal, and wherein the region has a predetermined yield point selected based on a selected composition function of the component;
   forming a first portion of the region, wherein the first portion comprises a first thickness, wherein the first portion further comprises a first cross-sectional shape, and wherein the first portion further comprises a first yield point; and
   forming a second portion of the region, wherein the second portion comprises a second thickness that is different from the first thickness, wherein the second portion further comprises a second cross-sectional shape that is different from the first cross-sectional shape, wherein the second portion further comprises a second yield point that is different from the first yield point, and wherein the second portion fails at a predetermined stress level.

2. The method of claim 1, wherein the first portion comprises a first material density and the second portion comprises a second material density different from the first material density.

3. The method of claim 1, wherein the first portion comprises a first coefficient of thermal expansion, and the second portion comprises a second coefficient of thermal expansion different from the first coefficient of thermal expansion.

4. The method of claim 1, wherein the powder comprises at least one of a nickel alloy that includes one or more of manganese, magnesium, chromium, silicon, cobalt, tungsten, tantalum, aluminum, titanium, hafnium, rhenium, molybdenum, nickel, iron, boron, niobium, vanadium, carbon, and yttrium; an iron alloy that includes one or more of manganese, magnesium, chromium, silicon, cobalt, tungsten, tantalum, aluminum, titanium, hafnium, rhenium, molybdenum, nickel, iron, boron, niobium, vanadium, carbon, and yttrium; a titanium alloy that includes one or more of manganese, magnesium, chromium, silicon, cobalt, tungsten, tantalum, aluminum, titanium, hafnium, rhenium, molybdenum, nickel, iron, boron, niobium, vanadium, carbon, and yttrium; or a cobalt alloy that includes one or more of manganese, magnesium, chromium, silicon, cobalt, tungsten, tantalum, aluminum, titanium, hafnium, rhenium, molybdenum, nickel, iron, boron, niobium, vanadium, carbon, and yttrium.

5. The method of claim 1, wherein a composition of the powder comprises less than 0.3 wt. % carbon, between 0.05 and 4 wt. % hafnium, less than 8 wt. % rhenium, less than 8 wt. % ruthenium, between 0.5 and 25 wt. % cobalt, between 0.0001 and 0.3 wt. % boron, between 1 and 20 wt. % aluminum, between 0.5 and 30 wt. % chromium, less than 1 wt. % manganese, between 0.01 and 10 wt. % molybdenum, between 0.1 and 20% tantalum, and between 0.01 and 10 wt. % titanium.

6. The method of claim 1, wherein the component comprises a tool.

7. The method of claim 6, wherein the tool comprises a hand tool.

\* \* \* \* \*